United States Patent
Okada

(10) Patent No.: US 8,257,637 B2
(45) Date of Patent: Sep. 4, 2012

(54) METHOD FOR REMOVING RESIN LAYER FROM RESIN-COATED METAL TUBE

(75) Inventor: Atsushi Okada, Sunto-gun (JP)

(73) Assignee: Usui Kakusai Sangyo Kaisha Limited (JP)

( * ) Notice: Subject to any disclaimer, the term of this patent is extended or adjusted under 35 U.S.C. 154(b) by 940 days.

(21) Appl. No.: 11/036,747

(22) Filed: Jan. 14, 2005

(65) Prior Publication Data

US 2005/0150522 A1   Jul. 14, 2005

(30) Foreign Application Priority Data

Jan. 14, 2004 (JP) .................................. 2004-7383
Dec. 28, 2004 (JP) ................................ 2004-378692

(51) Int. Cl.
B29C 35/08 (2006.01)

(52) U.S. Cl. ........ 264/400; 264/497; 264/724; 264/470; 264/482; 264/485; 264/492; 264/493; 264/641; 264/139; 264/162; 264/668; 264/681; 264/409; 264/481; 264/331.11; 264/446; 264/447; 264/154; 264/155; 264/156

(58) Field of Classification Search .................. 264/400, 264/409, 497, 481, 482, 331.11, 668, 681, 264/1.37, 479, 480, 488, 492, 494, 446, 447, 264/139, 154, 155, 156, 162, 424, 470, 485, 264/493, 641; 219/121.6–121.86; 505/410, 505/412; 977/888–889; 216/94; 438/940

See application file for complete search history.

(56) References Cited

U.S. PATENT DOCUMENTS

| 4,671,848 A | 6/1987 | Miller et al. |
| 6,660,350 B1 | 12/2003 | Campagna et al. |
| 2001/0045690 A1 * | 11/2001 | Brandinger ................... 264/400 |

FOREIGN PATENT DOCUMENTS

| DE | 199 00 910 A1 | 7/2000 |
| FR | 2 837 733 A1 | 10/2003 |
| JP | 11-082820 | 3/1999 |
| JP | 2003-336771 | 11/2003 |
| JP | 2004-176795 | 6/2004 |
| JP | 2005-98379 | 4/2005 |

* cited by examiner

*Primary Examiner* — Jeffrey Wollschlager
*Assistant Examiner* — Stella Yi
(74) *Attorney, Agent, or Firm* — Gerald E. Hespos; Michael J. Porco

(57) ABSTRACT

A method is provided for removing a resin layer of a resin-coated metal tube. The resin layer is removed with a laser beam. More particularly, the resin layer of a desired range is burned out by focusing the laser beam into a pinpoint without defocusing the sectional shape of the laser beam in the axial direction o the resin-coated metal tube.

20 Claims, 10 Drawing Sheets

PRIOR ART

PRIOR ART

PRIOR ART

METHOD FOR REMOVING RESIN LAYER FROM RESIN-COATED METAL TUBE

TECHNICAL FIELD

The present invention relates to a method for removing a film-shaped resin layer from a resin-coated metal tube, the resin-coated metal tube being a metal tube having a relatively small diameter of 20 mm or less and arranged as a piping for an automobile, an oil-pressure piping, a fuel piping, an air piping or the like, especially on the underside of the automobile-body, and having a film-shaped resin layer on its outer circumference for resisting the chipping (by raised pebbles) or the splashing (by muddy water) while the automobile is running, in which the resin layer is removed to allow the resin-coated metal tube to be worked at its end portion by a later working such as grooving, spooling, bulging and/or flaring treatment, and/or to be formed to have a grip portion for a clamping member at its intermediate portion. More specifically, the invention relates to a method for removing the resin layer with a laser beam.

BACKGROUND ART

In recent years, the piping to be arranged below the automobile, such as the oil-pressure piping for the power steering, the fuel piping such as the main piping, the return piping or the evaporation piping of the fuel and other piping is mostly exemplified by the resin-coated metal tube which has a resin-coated layer formed at least in a thin film shape or, if necessary, in a thick film shape so as to give the chipping-resistance and the splashing resistance.

Moreover, this coated metal tube is prepared by forming a chromate film, if necessary, over the plated layer plated with zinc or zinc/nickel on the outer circumference of the metal tube by the electric, chemical or melting method, by coating thereover an epoxy primer and polyvinyl fluoride (PVF) of a thickness of about 20 microns, and further by covering a heat-shrinkable tube all over its length to form a polymer-coated layer. Another known coated metal tube is prepared by extrusion-molding a resin such as a polyamide resin (PA) such as PA11 or PA12 having a thickness of about 200 to 300 microns or a polypropylene resin (PP) having a thickness of about 1 mm over the zinc- or zinc/aluminum-plated layer applied to the outer circumference of the metal tube.

The outer resin layer of the coated metal tube or polymer coated metal tube has to be removed in advance, in case the tube is to be subjected to a terminal working such as the grooving, spooling, bulging or flaring treatment or to be formed to have the grip portion by the clamp member. This resin layer peeling method can be exemplified by a cutting method. However, this cutting method cannot remove the resin layer homogeneously due to uneven precision of uneven target metal tube, such as the variation in the circularity, the straightness, the external diameter, the thickness of each layer and so on. In some case, the cutting edge may scrape or damage the underlying plated layer or the resin layer to be left as the inner layer. Another difficulty is to take troubles and time, because the underlying plated layer and the resin layer to be left as the inner layer have to be peeled homogeneously without any damage when peeling the resin layer peeling.

Therefore, we have previously proposed a method for peeling a resin layer from a resin-coated metal tube, which can peel off the resin layer remarkably simply and reliably without damaging the substrate and which can peel off only the outer layer even in the case of the polymer-coated resin layer is provided, if the outer layer is made of a softer resin than that of the inner layer (as referred to JP-A-11-82820).

This method has it as one of main features that, when a resin layer is to be peeled off from a resin-coated metal tube which is coated with the resin layer after prime-coated on its outer circumference, the resin layer is pushed by a peeling roll which pushes the resin layer radially inward from the outside and the metal tube and the pushing means are moved circumferentially relative to each other. FIG. 13 is a schematic diagram showing one example of the method. A resin layer (of an epoxy resin, PVF, polypropylene, polyethylene or a polyamide resin) 1-2 is peeled off by turning and pushing a plurality of peeling rolls 3, as arranged concentrically of a metal tube 1-1 made of a steel pipe having a diameter of about 20 mm or less, onto the resin layer 1-2 of a resin-coated metal tube 1 having the metal tube 1-1 coated on its outer circumference with the resin layer 1-2.

According to this method, there can be attained the effects to peel off the resin layer remarkably simply without damaging the substrate and to peel off the outer layer exclusively even in case the polymer-coated resin layer is formed, if the outer layer is made of a softer resin than that of the inner layer.

If the resin layer 1-2 of the resin-coated metal tube is pushed radially inward from the outside by the peeling roll 3, the resin layer 1-2 is extended to have its inner circumference extended by the pushing and turning peeling roll 3, although it is not clear why the resin layer is peeled off from the outer circumference of the metal tube 1-1. It seems that a separation is caused by the turns of the roll 2 in the interface with the extended inner circumference of the resin layer 1-2 so that only the resin layer 1-2 is peeled off.

Of the resin-coated metal tube, however, in case of a resin-coated metal tube, which is coated with nylon having an especially high rust preventing performance, when the nylon coating is subjected to the aforementioned method shown in FIG. 13 to be removed, there arises a problem that a bur 1-2' of nylon, as called the "Hige" or "Dama", occurs at the removed boundary, as shown in FIG. 14. This burr may cause problems such as the occurrence of contamination or the reduction in the sealing property so that it has to be removed by means of a cutter or the like. This undesirably increases the number of steps.

As countermeasures against those problems, we have also proposed a method for removing a resin layer (as referred to JA-2002-143398) without forming the burr called the "Hige" or "Dama" at the boundary portion by the aforementioned method using the peeling roll, even for the resin-coated metal tube which has been coated with nylon to have a high rust preventing ability.

In this method, as shown in FIG. 15 and FIG. 16, a resin layer 11-2 is pushed by a peeling roll 12 pushing radially inward from the outside, and a metal tube 11-1 and the peeling roll 12 are moved circumferentially relative to each other thereby to peel and remove the resin layer 11-2. This method is characterized in that a rolled portion 15 (FIG. 16) is formed to have a step and/or dent smaller than the thickness of the resin layer, by pushing means of a roll 12-1 in the resin layer 11-2 at the portion corresponding to the boundary portion of the pushing portion of the peeling roll 12.

According to this method, the resin layer can be removed remarkably simply and reliably without damaging the substrate and without forming the burr called the "Hige (sharp burr)" and "Dama (bead burr)" at the end portion.

In JP-C-3346580, on the other hand, there is disclosed a method for removing a resin layer from a resin-coated metal tube by using a laser beam. This method gasifies and removes a resin-coated layer by defocusing the laser beam in the tube axis direction in a circular section shape or generally in an elliptical shape. This method for removing the resin layer with the laser, as disclosed in JP-C-3346580, can remove the resin layer without leaving unremoved portion or forming the burr. Moreover, the method can remove the resin layer without damaging the substrate of the resin-coated metal tube, the surface-treated layer or the plated layer of the metal tube and so on, and can remove one or more layers of a multi-layered resin film.

DISCLOSURE OF INVENTION

Here, the aforementioned resin layer removing method (JA-2002-143398) is excellent in that it can remove the resin layer without forming the burr called the "Hige (sharp burr)" or the "Dame (bead burr)" at its end portion. However, the method has the rolled portion 15, as shown in FIG. 16, so that the resin layer inevitably has an unremoved portion 11-2a. Even when by the aforementioned method using the peeling roll, moreover, the peeling treatment is done without providing the rolled portion 15 or generating the burr called the "Hige" or "Dama", a burr 11-2b may occur at the boundary portion, as shown in FIG. 17. This unremoved portion 11-2a or the burr 11-2b exerts serious influences on the quality of the product and is, therefore, manually removed with a cutting knife after worked. This removal of the unremoved portion of the resin layer or the burr takes troubles and brings a high working cost, and may undesirably damage the plated layer of the substrate with the cutting edge.

On the other hand, the method (JP-C-3346580) for removing the resin layer by defocusing the laser beam into the elliptical shape is defective in that it requires a high-output laser to enlarge the size of the laser oscillator so that the cost for its apparatus is high. In order to change the width to peel (or the width to remove) of the resin layer, the thickness of the resin film, the moving stroke of the laser beam and so on, moreover, a complicated control is needed for masking the laser beam or for changing the defocus lens. Thus, the method has a defect that it is not suited for the production of diversified products.

The present invention has been conceived to eliminate the aforementioned defects of the prior art and to propose a method for removing a resin layer of a resin-coated metal tube, which makes it possible: to peel off the resin layer not manually but automatically without leaving any portion of the resin layer unremoved; to remove the resin layer with a low-powered laser; to adjust the peeled axial length (or the removed length) of the resin layer, the thickness of the resin layer, the movement of a laser beam, the peeling rate and so on easily, merely by adjusting the data of a laser control device; and to cope with the productions of diversified products without any rearrangement.

In a method for removing a resin layer of a resin-coated metal tube according to the invention, a resin layer is burned out from a resin-coated metal tube having a metal tube coated with the resin layer, by irradiating the resin layer with a laser beam, and the resin layer of a desired range is burned out by focusing the laser beam into a pinpoint without defocusing the sectional shape of the laser beam in the axial direction of the resin-coated metal tube. In this method, moreover, the resin layer of the desired range is burned out in a block shape by emitting the laser beam focused into the pinpoint, and doing scanning in a grating shape, in a longitudinal direction and in a transverse direction. Still moreover, the resin layer of the desired range is burned out in a multiplicity of block shapes by executing the grating shape scanning operations repeatedly. In a method for removing a resin layer of a resin-coated metal tube, furthermore, the first laser beam irradiation is performed as the method for burning out the resin layer by irradiating the resin layer with the laser beam, while the resin-coated metal tube being fixed, and wherein after completion of the irradiation of a desired length, the remaining resin layer is irradiated with the laser beam by turning the resin-coated metal tube or a laser irradiation device by a predetermined angle and then by fixing the same. Furthermore, the resin layer is burned out by using a plurality of laser irradiation devices as the method for burning out the resin layer by irradiating the resin layer with the laser beam.

According to the invention, in a method for removing a resin layer of a resin-coated metal by irradiating the resin layer with the laser beam, the metal tube is turned while the laser irradiation device is fixed, or the laser irradiation device is turned while the metal tube is fixed. When the resin layer is to be burned out by irradiating the resin layer with the laser beam, still moreover, the laser beam is directed zigzag or helically on the resin layer by changing the laser irradiation angle, and the laser beam is directed by using a reflection mirror. In these resin layer removing methods, furthermore, after the resin layer was burned out by irradiating the resin layer with the laser beam, the boundary portion of the removed resin layer is irradiated again with the laser beam to seal the end portion of the resin layer by melting and welding the same. Furthermore, the invention is incorporated into an automatic pipe working line for subjecting the end portion of a tube to a plastic working while transferring the tube sequentially by an automatic feed unit.

The present invention employs the method, in which the laser beam is not defocused in the axial direction but focused into the pinpoint to do scanning in the grating shape at the high speed, can remove the resin layer with a small-sized lower output laser than the method for defocusing the laser beam, so that its apparatus cost and running cost can be drastically lower. The method can adjust the peeled axial length (or the removed length) of the resin layer, the thickness of the resin layer, the movement of a laser beam, the peeling rate and so on easily, merely by adjusting the data of a laser control device and can cope with the productions of diversified products without any rearrangement.

Moreover, the resin layer can be completely removed without forming the unremoved portion, the burr and so on. In addition, the resin layer can be removed by adjusting the laser output without damaging the substrate of the resin-coated metal tube, the surface-treated layer, the plated layer or the like of the metal tube. It is also possible to remove one or plural layers of the multi-layered resin films or to adjust the thickness of the resin layer film. After the resin layer was burned out by irradiating the resin layer with the laser beam in the resin layer removing method, the boundary portion of the removed resin layer is irradiated again with the laser beam to seal the end portion of the resin layer by melting and welding the same. Thus, the sealing property between the metal tube and the resin layer can be improved to prevent the liquid completely from penetrating between the metal tube and the resin layer.

According to the invention, furthermore, the laser working means is incorporated into the automatic pipe working line for subjecting the end portion of the tube to the plastic working while carrying the tube sequentially by the automatic feed unit so that the removal of the resin layer and the terminal plastic working such as the flaring or spooling operation of the resin-coated metal tube can be continuously executed to lower the production cost.

BEST MODE FOR CARRYING OUT THE INVENTION

Figure 1:
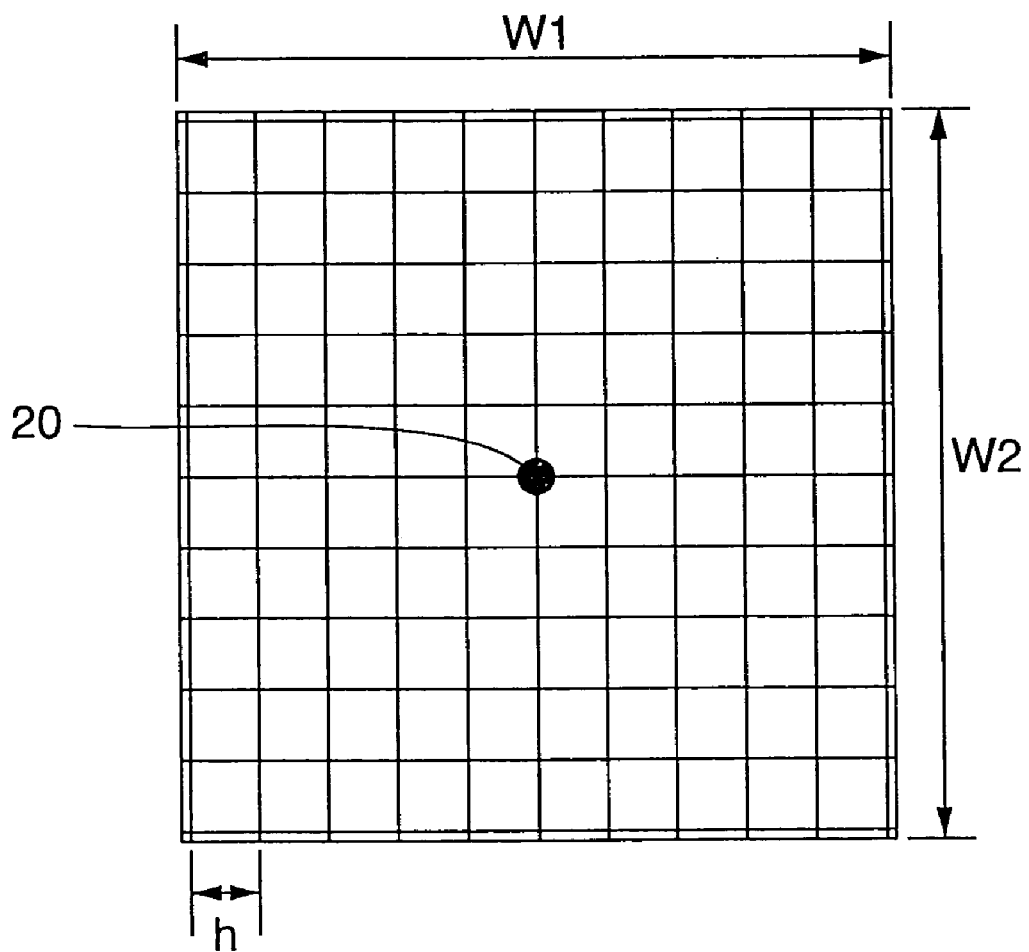
FIG. 1 is a schematic explanatory view showing one example of an operation pattern of a method of the invention for focusing a laser beam in a pinpoint to do a scan in a grating shape at a high speed.
Figure 2:
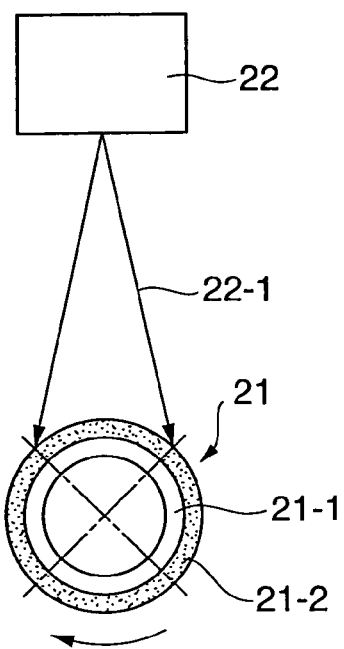
FIG. 2 is a schematic explanatory view showing a first embodiment of a method for removing a resin layer from a resin-coated metal tube in the operation pattern shown in FIG. 1.
Figure 3:
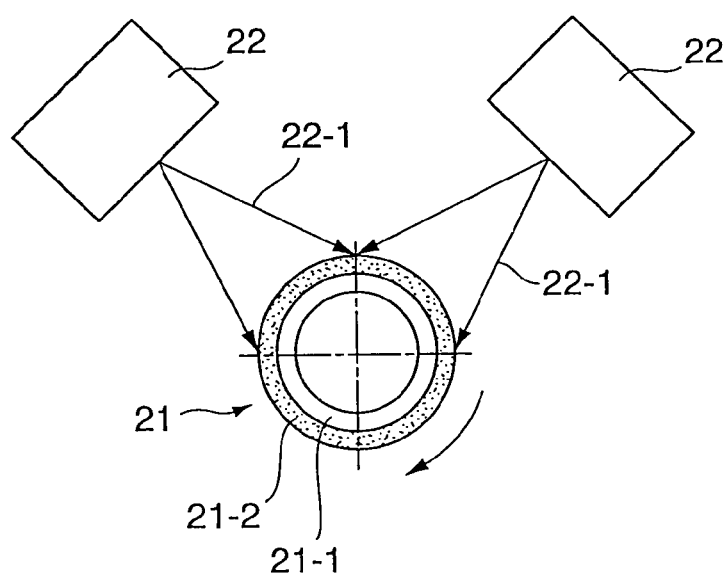
FIG. 3 is also a schematic explanatory view showing a second embodiment of the method for removing a resin layer from a resin-coated metal tube by the method shown in FIG. 1.
Figure 4:
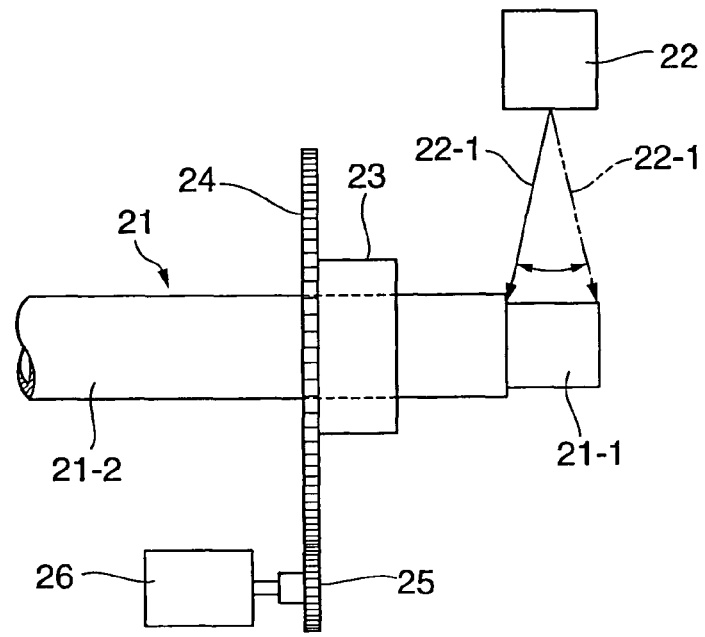
FIG. 4 is a schematic side elevation showing a first embodiment of an apparatus for executing the method of the invention.
Figure 5:
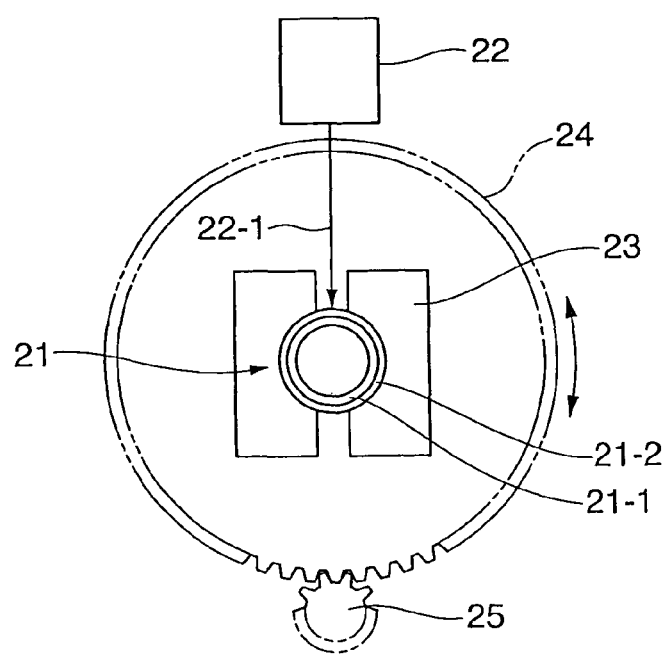
FIG. 5 is a schematic front elevation of the apparatus shown in FIG. 4.
Figure 6:
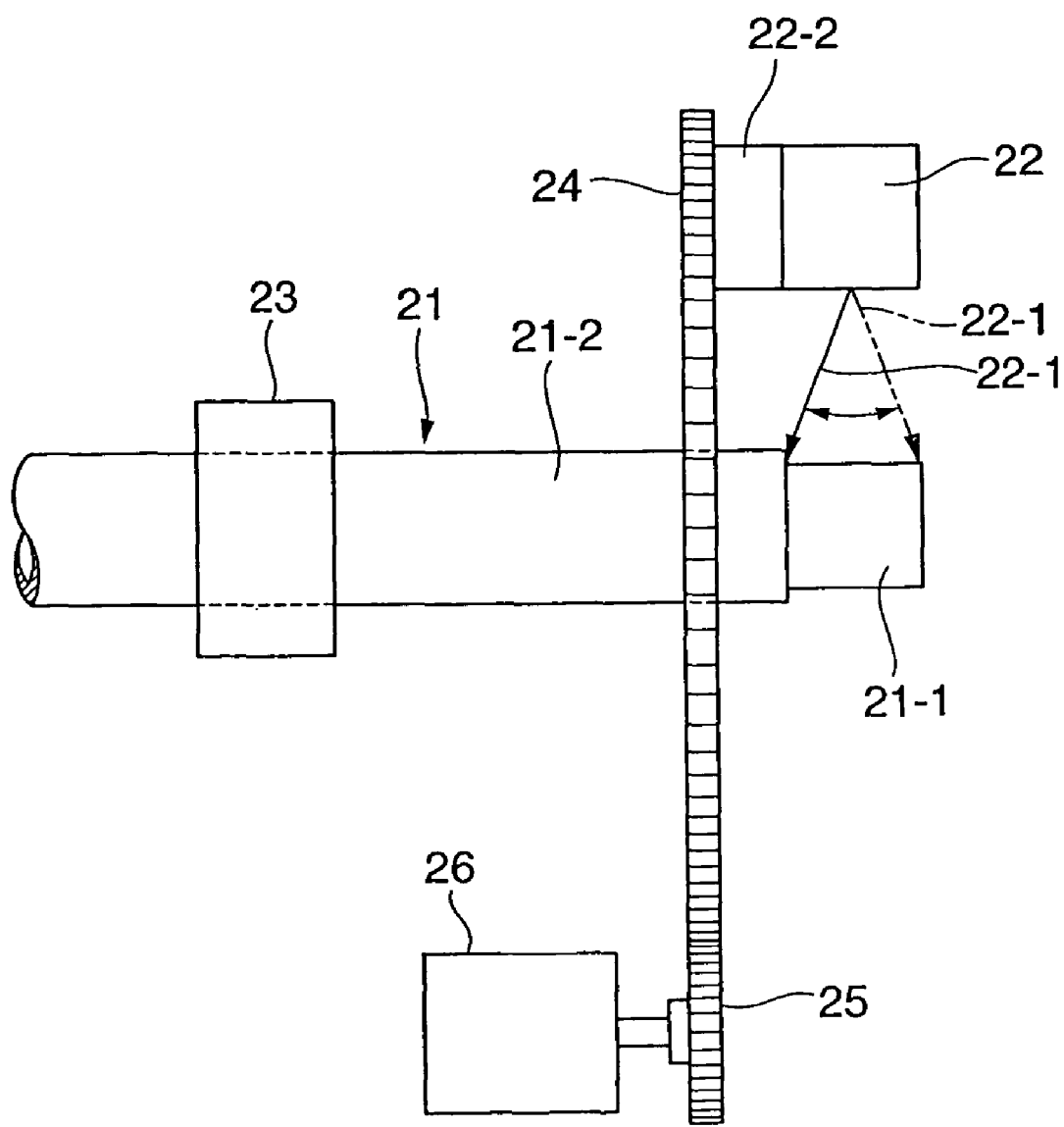
FIG. 6 is a schematic side elevation showing a second embodiment of the apparatus for executing the method of the invention.
Figure 7:
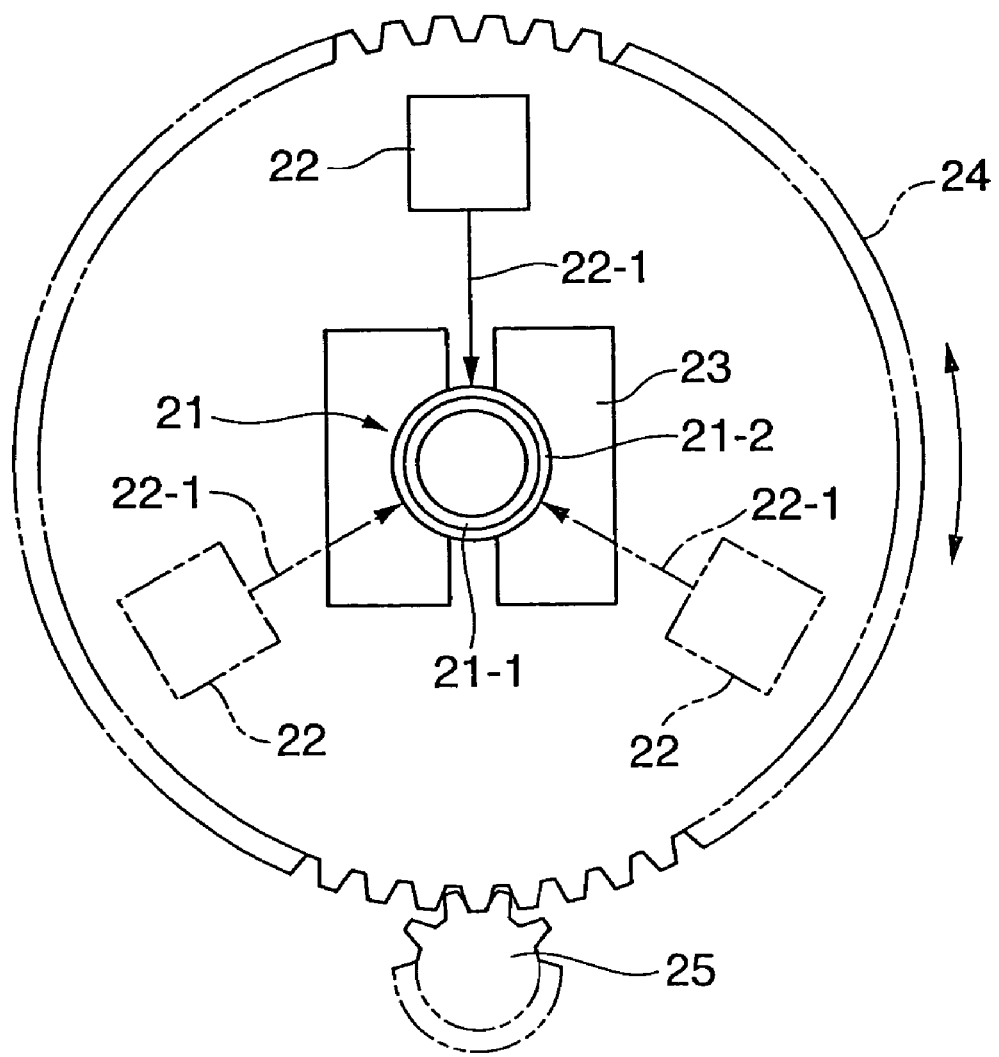
FIG. 7 is a schematic front elevation of the apparatus shown in FIG. 6.
Figure 8:
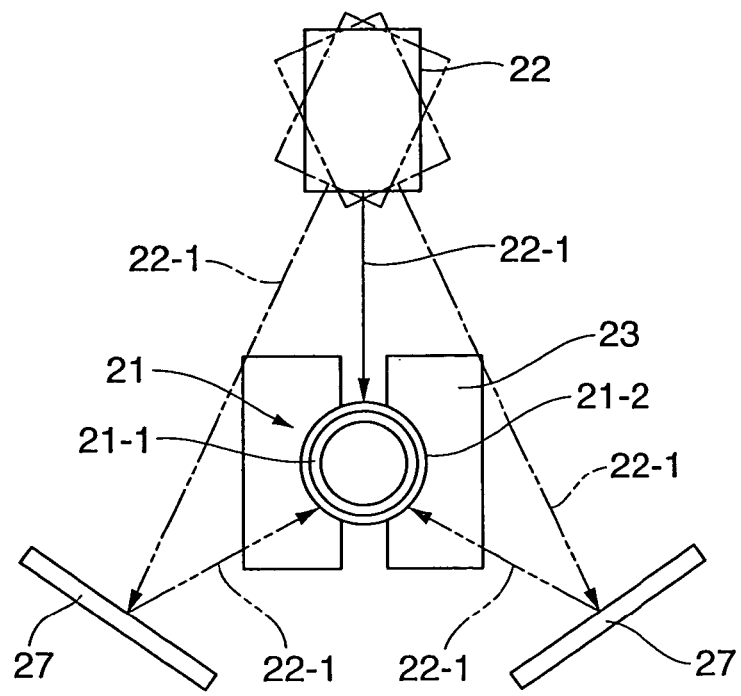
FIG. 8 is also a schematic front elevation showing a third embodiment of the apparatus for executing the method of the invention.
Figure 9:
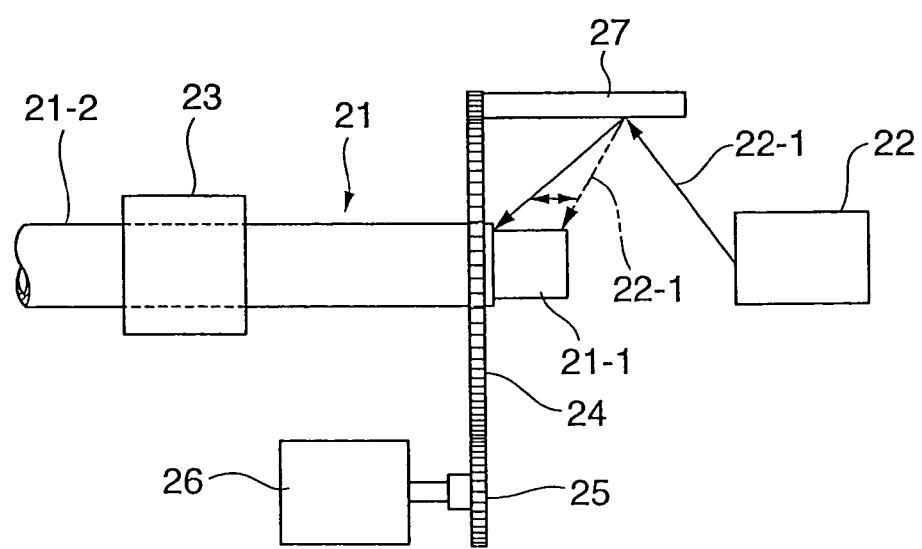
FIG. 9 is also a schematic front elevation showing a fourth embodiment of the apparatus for executing the method of the invention.
Figure 10:
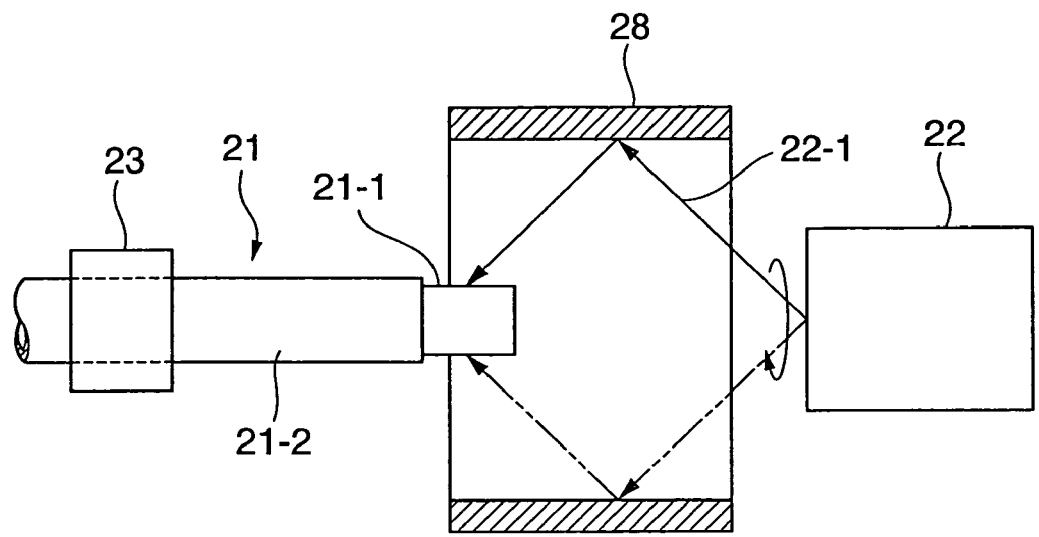
FIG. 10 is also a schematic front elevation showing a fifth embodiment of the apparatus for executing the method of the invention.
Figure 11:
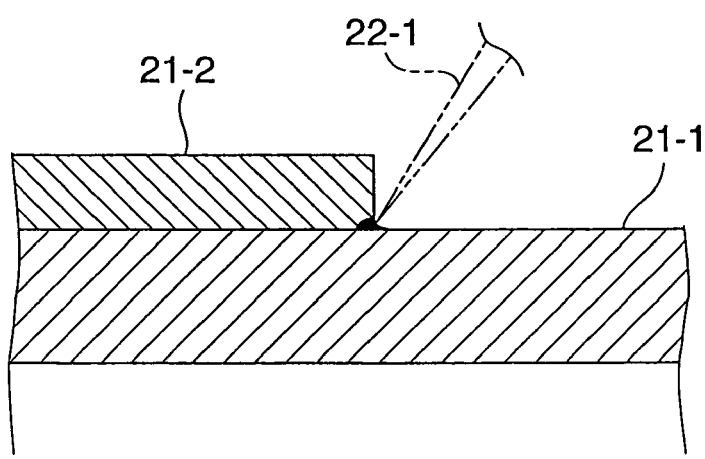
FIG. 11 is a schematic longitudinal side elevation showing one example of a method for improving a sealing property between a metal tube and a resin layer after the resin layer was removed.
Figure 12:
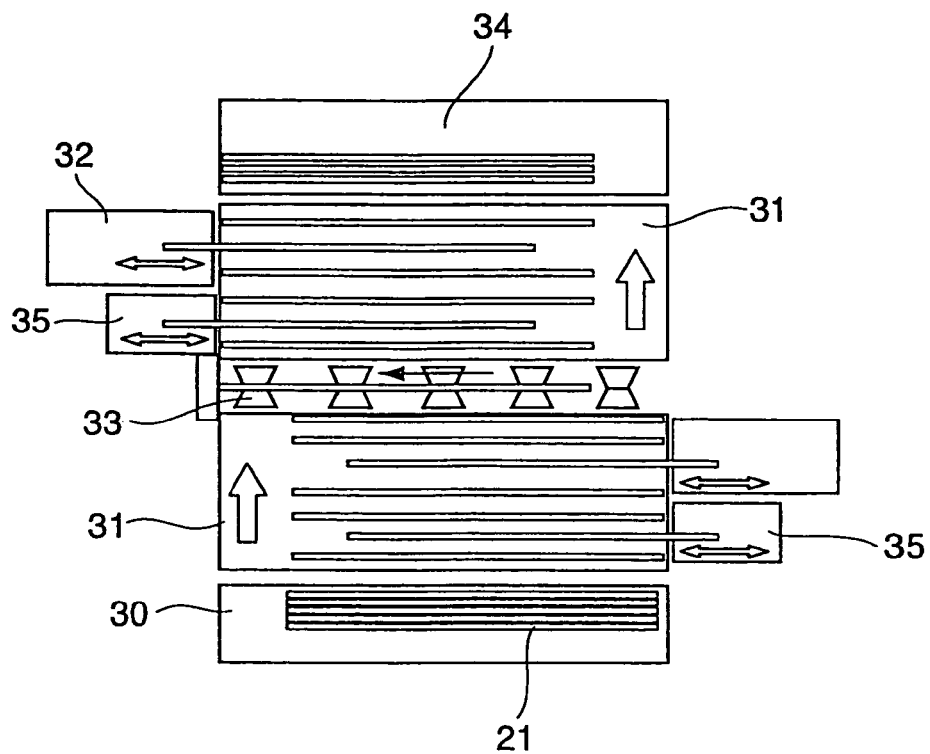
FIG. 12 is a schematic explanatory view showing an embodiment, in which the method of the invention is incorporated into an automatic pipe working line.
Figure 13:
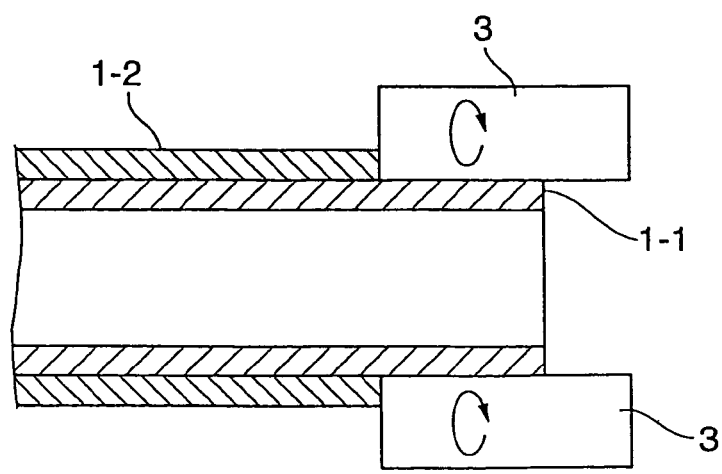
FIG. 13 is a schematic side elevation showing one example of the resin layer peeling apparatus of the prior art.
Figure 14:
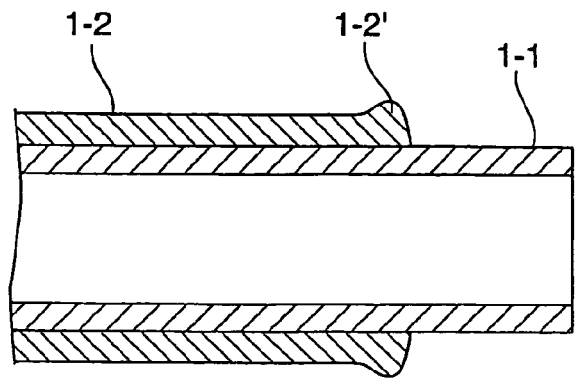
FIG. 14 is a transverse section showing a portion of the resin-coated metal tube after the resin layer was removed by the apparatus shown in FIG. 7.
Figure 15:
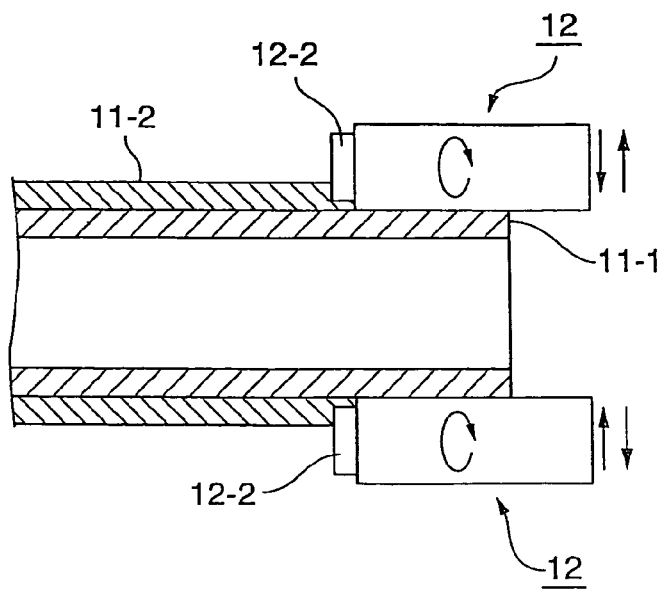
FIG. 15 is a schematic side elevation showing another example of the resin layer peeling apparatus of the prior art.
Figure 16:
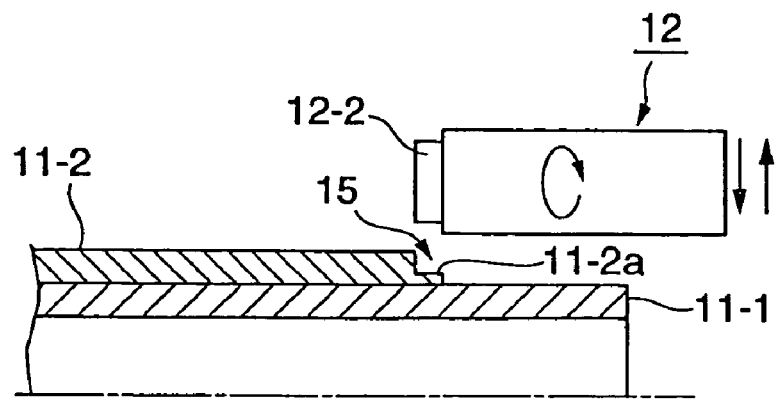
FIG. 16 is an enlarged transverse half section showing a portion of the resin-coated metal tube after the resin layer was removed by the apparatus shown in FIG. 15.
Figure 17:
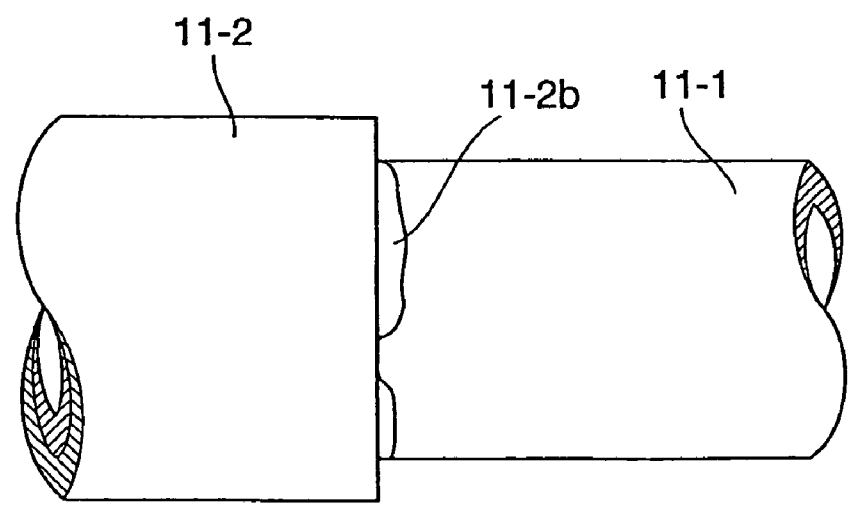
FIG. 17 is an enlarged side elevation showing a portion of the resin-coated metal tube after the resin layer was removed by the resin layer peeling apparatus of the prior art.

FIG. 1 is a schematic explanatory view showing one example of an operation pattern of a method of the invention for focusing a laser beam in a pinpoint to do a scan in a grating shape at a high speed it; FIG. 2 is a schematic explanatory view showing a first embodiment of a method for removing a resin layer from a resin-coated metal tube in the operation pattern shown in FIG. 1; FIG. 3 is also a schematic explanatory view showing a second embodiment of the method for removing a resin layer from a resin-coated metal tube by the method shown in FIG. 1; FIG. 4 is a schematic side elevation showing a first embodiment of an apparatus for executing the method of the invention; FIG. 5 is a schematic front elevation of the apparatus shown in FIG. 4; FIG. 6 is also a schematic side elevation showing a second embodiment of the apparatus for executing the method of the invention; FIG. 7 is a schematic front elevation of the apparatus shown in FIG. 6; FIG. 8 is also a schematic front elevation showing a third embodiment of the apparatus for executing the method of the invention; FIG. 9 is also a schematic front elevation showing a fourth embodiment of the apparatus for executing the method of the invention; FIG. 10 is also a schematic front elevation showing a fifth embodiment of the apparatus for executing the method of the invention; FIG. 11 is a schematic longitudinal side elevation showing one example of a method for improving a sealing property between a metal tube and a resin layer after the resin layer was removed; and FIG. 12 is a schematic explanatory view showing an embodiment, in which the method of the invention is incorporated into an automatic pipe working line. Reference numeral 20 designates a sectional shape of a pinpoint laser beam; numeral 21 a resin-coated metal tube (or work); numeral 22 a laser irradiation device; numeral 23 a chuck; numeral 24 a gear wheel; numeral 25 a pinion; numeral 26 a drive motor; numeral 27 plate-shaped reflection mirrors; numeral 28 an annular reflection mirror; numeral 30 a pipe chute; numeral 31 a pipe transfer unit; numeral 32 a terminal working unit; numeral 33 a pipe feed unit; numeral 34 a pipe delivery carriage; numeral 35 a laser working unit; letters W1 and W2 a transverse length and a longitudinal length of a pattern (i.e., a square), respectively; and letter h a length of a grating.

First of all, the resin-coated metal tube 21 is formed to include: a relatively thin metal tube 21-1 made of a steel pipe of a diameter of about 20 mm or less, such as an electro formed tube, a seamless tube, a semi-seamless tube or a soldered or welded tube formed by one or more copper alloy plated layers; and a resin layer 21-2 coating the outer circumference of the metal tube 21-1 and formed of either a polymer resin layer of an epoxy resin and a PVF or a film-shaped single layer of a polypropylene, polyethylene or polyamide resin. Here, it goes without saying that the resin layer of the resin-coated metal tube should not be limited to a single layer but may be a multi-layered resin layer.

The operation pattern shown in FIG. 1 presents a pattern having the lengths W1 and W2 of 2 mm and the width h of 0.2 mm. The laser beam is focused into a circular pinpoint (of about 150 microns) sectional shape 20, and is caused to do a scan in the grating shape, as shown, at a speed of about 1,000 mm/sec. to remove the resin layer in a block shape. By combining this block-shaped pattern, the laser beam is enabled to match any shape to remove (or peel). The processing time of the operation pattern, as shown in FIG. 1, is about 0.05 seconds, and one shot can remove the resin layer of a thickness of 50 microns.

FIG. 2 exemplifies a method for removing the resin layer 21-2 by using the operation pattern shown in FIG. 1 and by turning the resin-coated metal tube 21 while fixing one laser irradiation device 22. In this case, the resin layer 21-2 of the entire circumference is burned out with totally four laser irradiations, by removing the resin layer 21-2 of a turning angle of 90 degrees of the resin-coated metal tube 21 by a single laser irradiation and then by turning the resin-coated metal tube 21 three times every 90 degrees.

FIG. 3 exemplifies a method for removing the resin layer with the operation pattern, as shown in FIG. 1, by using the two laser irradiation devices 22. In this case, the resin layer 21-2 of a turning angle of 180 degrees (i.e., one half of the circumference) is removed by executing the laser irradiations simultaneously on the stationary resin-coated metal tube 21 with the two laser irradiation devices 22. After this, the resin-coated metal tube 21 is turned by a turning angle of 180 degrees so that the remaining resin layer 21-2 of the turning angle of 180 degrees is removed. In the case of this method, by executing the laser irradiations simultaneously with the two laser irradiation devices 22, it is possible to shorten the working time and to reduce the turning stroke or angle of the resin-coated metal tube. This simultaneous irradiation can raise the temperature of the resin-coated metal tube faster thereby to remove the resin layer more efficiently.

Here will be described an apparatus for executing the method of the invention. The first embodiment apparatus shown in FIG. 4 and FIG. 5 exemplifies the type of apparatus, in which the resin layer 21-2 is removed by turning the resin-coated metal tube 21 while fixing the laser irradiation device 22. While the resin-coated metal tube 21 is being clamped by the movable chuck 23 attached integrally to the gear wheel 24, resin-coated metal tube 21 is turned through the pinion 25 and the gear wheel 24 by the drive motor 26, and a laser beam 22-1 of a predetermined burning width is irradiated by the laser irradiation device 22 which is arranged at a right angle with respect to the axis of that resin-coated metal tube so that the resin layer 21-2 is burned out.

When the resin layer 21-2 of the resin-coated metal tube 21 is to be burned out by this method, the surface of the resin-coated metal tube 21 can be irradiated in a zigzag, parallel or crosswise pattern by changing the laser irradiation angle. At this time the resin layer 21-2 can be burned out by turning the resin-coated metal tube 21 once by 120 degrees, for example, and the entire circumference can be burned out by repeating this operation three times. Alternatively, the resin layer 21-2 can be burned out by irradiating it with the laser beam helically by pivoting at least part of the laser irradiating device about a pivot axis angularly aligned to the axis of the resin-coated metal tube 21 for changing the laser irradiation angle as indicated by the solid and broken lines 22-1 while turning the resin-coated metal tube 21.

Next, the second embodiment apparatus shown in FIG. 6 and FIG. 7 exemplifies the type of apparatus, in which the resin layer 21-2 is removed by turning the laser irradiation device 22 while fixing the resin-coated metal tube 21. The construction is made such that the laser irradiation device 22 is arranged on the gear wheel 24 through a bracket 22-2 and at a right angle with respect to the axis of the resin-coated metal tube 21. While the resin-coated metal tube 21 is being clamped by the movable chuck 23 disposed separately of the gear wheel 24, the resin layer 21-2 is burned out with the laser beam 22-1 by turning the laser irradiation device 22 through the pinion 25 and the gear wheel 24 by the drive motor 26. In case the resin layer 21-2 of the resin-coated metal tube 21 is to be burned out by this method, too, the surface of the resin-coated metal tube 21 can be irradiated in the zigzag, parallel, crosswise or helical pattern by pivoting at least part of the laser irradiating device about a pivot axis angularly aligned to the axis of the resin-coated metal tube 21 for changing the laser irradiation angle as indicated by the solid and broken lines 22-1 of the laser irradiation device 22.

In place of the aforementioned type of apparatus using the turning motions of the resin-coated metal tube 21 or the laser irradiation device 22, on the other hand, the third embodiment apparatus shown in FIG. 8 employs the type of apparatus, in which the resin layer 21-2 is removed with the laser beam 22-1 by employing the plate-shaped reflection mirrors 27. In this type of apparatus, the laser irradiation device 22, which is arranged at a right angle with respect to the resin-coated metal tube 21 to be clamped by the chuck 23, is disposed to have a variable laser irradiation angle, and the plate-shaped reflection mirrors 27 for reflecting the laser beam 22-1 of that laser irradiation device 22 are arranged on a common circumference at a spacing of 120 degrees from that laser irradiation device 22. The resin layer 21-2 of a portion of the resin-coated metal tube 21 to be burned out is burned out over the entire circumference by irradiating the resin-coated metal tube 21 clamped by the chuck 23 with the laser beam 22-1 by the laser irradiation device 22 and by reflecting the laser beam 22-1 by the plate-shaped reflection mirrors 27 while changing the laser irradiation angle of the laser irradiation device 22. Here is presented the case, in which the two plate-shaped reflection mirrors 27 are used, but no limit is made to the number of the plate-shaped reflection mirrors to be used.

Moreover, the fourth embodiment apparatus shown in FIG. 9 is of the type of apparatus, in which the resin layer is burned out all over its circumference by turning the plate-shaped reflection mirror to cause the laser beam to follow the mirror while leaving the tube unturned. The construction is made such that the laser irradiation device 22 is arranged on the axis of the resin-coated metal tube 21 clamped by the movable chuck 23 so as to vary the laser irradiation angle, and the plate-shaped reflection mirror 27 for reflecting the laser beam 22-1 of the laser irradiation device 22 to irradiate the surface of the resin-coated metal tube 21 with the beam is attached to the gear wheel 24. The resin layer 21-2 of a portion of the resin-coated metal tube 21 to be burned out is burned out all over its circumference by turning the mirror 27 through the pinion 25 and the gear wheel 24 by the drive motor 26 and by causing the laser beam 22-1 to follow the turning motion of the plate-shaped reflection mirror 27.

Still moreover, the fifth embodiment apparatus shown in FIG. 10 is of the type of apparatus, in which the resin layer 21-2 is removed with the laser beam 22-1 by using an annular reflection mirror 28 in place of the plate-shaped reflection mirror 27. The construction is made such that the laser irradiation device 22 is arranged on the axis of the resin-coated metal tube 21 to be clamped by the movable chuck 23, and the annular reflection mirror 28 is arranged between the laser irradiation device 22 and the resin-coated metal tube 21. The resin layer 21-2 of a portion of the resin-coated metal tube 21 to be burned out is burned out by turning the laser beam 22-1 by the laser irradiation device 22 with respect to the unturned resin-coated metal tube 21 clamped by the movable chuck 23, thereby to reflect the laser beam 22-1 on the annular reflection mirror 28 to do scanning.

According to the respective embodiment apparatus thus far described, the resin layer can be removed completely without any unremoved portion or any burr. According to the method of the invention, moreover, the boundary portion of the resin layer 21-2 having been removed with the laser beam 22-1 is irradiated again with the laser beam 22-1, as shown in FIG. 11, to melt and weld the end portion of the resin layer to the metal tube 21. It is, therefore, possible to improve the sealing property between the metal tube 21-1 and the resin layer 21-2, and to prevent the liquid completely from penetrating between the metal tube 21-1 and the resin layer 21-2.

According to the invention, as shown in FIG. 12, the laser working unit 35 of the invention is assembled with the automatic pipe working line which is constructed to include the pipe chute 30, the pipe transfer unit, the terminal working unit 32, the pipe feed unit 33 and the pipe delivery carriage 34. As a result, the resin-coated metal tube 21, which is cut to a regular length and fed from the pipe chute 30, has the resin layer of its one end portion removed by the laser working unit 35 while being sequentially transferred by the pipe transfer unit 31 on the entrance side. Next, the resin-coated metal tube 21 is subjected on the same side to a terminal plastic working. The resin-coated metal tube 21 has the resin layer at its other tube end portion removed by the laser working unit while being moved in the axial direction by the pipe feed unit 33 and sequentially transferred by the pipe transfer unit 31 on the exit side. The resin-coated metal tube 21 is subjected on the that side to the terminal plastic working by the terminal working unit 32 on the same side, and can be delivered out by the pipe delivery carriage 34.

Thus, according to the invention, the laser working means is incorporated into the automatic pipe working line for subjecting the end portion of the tube to the plastic working while carrying the tube sequentially by the automatic feed unit. Merely by delivering the resin-coated metal tube cut to the regular length into that line, therefore, it is possible to continuously execute the removal of the resin layer of the resin-coated metal tube and the terminal plastic working such as the flaring or spooling operation thereby to lower the production cost.

Here, it goes without saying that a rack-pinion mechanism can also be adopted as the turning drive mechanism of the resin-coated metal tube 21 in the individual embodiment apparatus thus far described and shown in FIG. 4 to FIG. 9. In case the resin layer is to be burned out, it also goes without saying that the laser output is adjusted according to the film thickness and material of the resin layer so that the substrate of the resin-coated metal tube, the plated layer and the surface treating layer of the metal tube and so on may not be damaged. The description has been made by exemplifying the resin-coated metal tube having a single resin layer. When only the uppermost layer is to be burned out in the case of the resin-coated metal tube having multiple resin layers, it also goes without saying that the laser output is similarly adjusted so as not to damage the lower resin layer.

Industrial Applicability

The present invention can be applied to the removal of the resin layer of not only the oil-pressure piping, the fuel piping and the air piping of the automobile but also the resin-coated metal tubes of various kinds for the other fields.

What is claimed is:

1. A method for removing a resin layer from an outer circumference of a resin-coated metal tube, the metal tube having an axis, the method comprising: irradiating said resin layer along a desired range parallel to the axis by focusing a laser beam of at least one laser irradiating device into at least one pinpoint without defocusing a sectional shape of said laser beam, rotating at least one of the resin-coated metal tube and the laser irradiating device about the axis of the resin-coated metal tube, and pivoting at least part of the laser irradiating device about a pivot axis angularly aligned to the axis of the resin-coated metal tube while simultaneously performing the rotating of at least one of the resin-coated metal tube and the laser irradiating device about the axis of the resin-coated tube for changing a laser irradiation angle relative to the axis of the resin-coated metal tube so that the laser beam burns out said resin layer in a block shape by scanning the laser beam focused into said pinpoint in a grating shape in a longitudinal direction and in a transverse direction and executing said grating shape scanning operation repeatedly to burn out the resin layer along the desired range, and wherein after said resin layer is burned out by irradiating said resin layer with the laser beam, the method further includes irradiating the resin layer again at a boundary with the metal tube to melt an end portion of said resin layer to seal the resin layer to the metal tube by melting and welding the resin layer to prevent liquid from penetrating between the resin layer and the metal tube.

2. The method for removing a resin layer of a resin-coated metal tube according to claim 1, wherein a first laser beam irradiation is performed while the resin-coated metal tube is fixed, and wherein after completion of the irradiation of the desired range, the method proceeds by turning the resin-coated metal tube or the at least one laser irradiation device by a predetermined angle, fixing the same and then performing a second irradiation.

3. The method for removing a resin layer of a resin-coated metal tube according to claim 1, wherein the at least one laser irradiating device comprises a plurality of laser irradiation devices for burning out said resin layer.

4. The method for removing a resin layer of a resin-coated metal tube according to claim 2, comprising rotating the metal tube about the axis while fixing the laser irradiation device.

5. The method for removing a resin layer of a resin-coated metal tube according to claim 2, comprising rotating the laser irradiation device about the axis while fixing the metal tube.

6. The method for removing a resin layer of a resin-coated metal tube according to claim 4, comprising reflecting the laser beam off a reflection mirror and onto said resin layer.

7. A method for removing a resin layer from an outer circumference of a resin-coated metal tube along a desired range of the metal tube, the method comprising: irradiating the resin layer along a desired range of the resin-coated metal tube to burn out the resin layer in a block shape by focusing a laser beam into a pinpoint without defocusing the sectional shape of the laser beam and executing a scanning of the laser beam focused into the said pinpoint, the scanning being carried out in a grating shape in a longitudinal direction and in a transverse direction that is transverse to the longitudinal direction, and repeating the step of executing the scanning of the laser beam repeatedly for burning out the resin layer in a multiplicity of the block shapes along the desired range of the metal tube.

8. The method of claim 7, further comprising reflecting the laser beam off a plurality of plate-shaped mirrors so that the laser beam from the laser irradiating device is reflected to a plurality of spaced apart locations about the outer circumference of the resin-coated metal tube.

9. The method of claim 7, further comprising reflecting the laser beam off at least one non-planar mirror so that the laser beam from the laser irradiating device is reflected to a plurality of locations spaced about the outer circumference of the resin-coated metal tube.

10. A method for removing a resin layer from an outer circumference of a resin-coated metal tube, the method comprising:
  clamping the resin-coated metal tube so that an axis of the resin-coated metal tube is offset from at least one laser irradiating device;
  operating the at least one laser irradiating device to produce at least one laser beam;
  pivoting the laser irradiating device so that the laser beam sweeps through an arc that lies in a plane aligned at an angle to the axis of the resin-coated metal tube;
  reflecting the laser beam alternately off at least two reflective surfaces as the laser irradiating device pivots to produce a reflected laser beam focused into a pinpoint on at least two areas of the resin layer without defocusing the sectional shape of the laser beam for burning out the resin layer at selected regions of the resin-coated metal tube in a multiplicity of block shapes by repeatedly scanning the laser beam focused into said pinpoint in a grating shape in a longitudinal direction and a transverse direction; and wherein after said resin layer is burned out by irradiating said resin layer with the laser beam, the method further includes irradiating the resin layer again at a boundary with the metal tube to melt an end portion of said resin layer to seal the resin layer to the metal tube by melting and welding the resin layer to prevent liquid from penetrating between the resin layer and the metal tube.

11. The method of claim 10, wherein the step of reflecting the laser beam off at least two reflective surfaces comprises reflecting the laser beam sequentially off at least two plate-shaped mirrors.

12. The method of claim 10 wherein the step of reflecting the laser beam off at least two reflective surfaces comprises reflecting the laser beam sequentially off at least two surface areas on an annular mirror.

13. The method for removing a resin layer of a resin-coated metal tube according to claim 7, wherein said method is incorporated into an automatic pipe working line for subjecting the end portion of a tube to a plastic working while transferring said tube sequentially by an automatic feed unit.

14. The method for removing a resin layer of a resin-coated metal tube according to claim 7, wherein the irradiating of the resin layer is performed while the resin-coated metal tube is fixed, and wherein after completion of a first irradiation, the method proceeds by turning the resin-coated metal tube or a laser irradiation device that produces the laser beam by a predetermined angle, fixing the metal tube or the laser irradiation device and then performing a second irradiation.

15. The method for removing a resin layer of a resin-coated metal tube according to claim 14, comprising rotating the metal tube about an axis of the metal tube while fixing the laser irradiation device.

16. The method for removing a resin layer of a resin-coated metal tube according to claim 14, comprising rotating the laser irradiation device about an axis of the metal tube while fixing the metal tube.

17. The method for removing a resin layer of a resin-coated metal tube according to claim 7, wherein the irradiating step is carried out by a plurality of laser irradiation devices for burning out said resin layer.

18. The method for removing a resin layer of a resin-coated metal tube according to claim 7, comprising reflecting the laser beam off a reflection mirror and onto said resin layer.

19. The method for removing a resin layer of a resin coated metal tube according to claim 7, wherein the irradiating of the resin layer is carried out with a laser irradiating device, the method further comprising changing a laser irradiation angle of the laser irradiating device for directing the laser zigzag or helically on the resin layer.

20. The method for removing a resin layer of a resin coated metal tube according to claim 7, wherein the step of focusing said laser beam into a pinpoint without defocusing the sectional shape of the laser beam comprises focusing the laser beam into a circular pinpoint of about 150 microns.

* * * * *